United States Patent
Cobo et al.

(10) Patent No.: US 6,496,690 B1
(45) Date of Patent: Dec. 17, 2002

(54) PREPAID SUBSCRIBER SERVICE FOR PACKET-SWITCHED AND CIRCUIT-SWITCHED RADIO TELECOMMUNICATIONS NETWORKS

(75) Inventors: Miguel Cobo, Montreal (CA); Betty Lee, St. Laurent (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/306,705

(22) Filed: May 7, 1999

(51) Int. Cl.[7] .............................................. H04M 11/00
(52) U.S. Cl. .................... 455/408; 370/352; 379/114.2; 455/406
(58) Field of Search ................................ 455/405, 406, 455/407, 408, 466; 379/114.2, 114.19, 114.29, 114.06, 114.07, 114.15, 114.17; 370/338, 352, 401

(56) References Cited

U.S. PATENT DOCUMENTS

| | | | |
|---|---|---|---|
| 5,748,720 A | 5/1998 | Loder | 379/144 |
| 6,088,431 A | * 7/2000 | LaDue | 379/114.2 |
| 6,157,617 A | * 12/2000 | Brandin et al. | 345/738 |
| 6,185,414 B1 | * 2/2001 | Brunner et al. | 455/406 |
| 6,226,364 B1 | * 5/2001 | O'Neil | 379/112.01 |
| 6,333,976 B2 | * 12/2001 | Lesley | 379/114.01 |
| 6,389,008 B1 | * 5/2002 | Lupien et al. | 370/338 |

FOREIGN PATENT DOCUMENTS

| | | | |
|---|---|---|---|
| EP | 0 346 897 A2 | * 12/1989 | |
| EP | 1014619 | * 6/2000 | |
| WO | WO97/26739 | 7/1997 | |
| WO | WO97/26764 | 7/1997 | |
| WO | WO98/49825 | 11/1998 | |
| WO | WO 98/56202 | * 12/1998 | |
| WO | WO 99/16266 A1 | * 4/1999 | H04Q/7/22 |
| WO | WO99/17497 | 4/1999 | |
| WO | WO 99/29065 | * 6/1999 | |
| WO | WO00/24161 | 4/2000 | |
| WO | WO 00/56085 | * 9/2000 | |
| WO | WO 0069118 A1 | * 11/2000 | H04L/12/14 |

OTHER PUBLICATIONS

Business Editors & Technology Writers, "Logica Enhances its World–Leading Short Message Solution to Enable WAP, GPRS and Prepaid SMS", Feb. 28, 2000, Business Wire, NY, start page: 1.*
Tade, David, "Market expections: Will 3G deliver on its promise?", Nov. 1999, Telecommunications, Horizon House Publications Inc., Internation Edition, vol. 33, Start page: S83–S86.*
Margulies, Ed, "A switch in time", Feb. 1999, Computer Telephony, San Francisco, Miller Freeman Inc., vol. 7, Issue 2, start page: 150.*

* cited by examiner

*Primary Examiner*—Vivian Chin
*Assistant Examiner*—Charles N. Appiah
(74) *Attorney, Agent, or Firm*—Smith & Danamraj, PC (57) ABSTRACT

A system and method of providing a prepaid subscriber service to a mobile subscriber in an integrated wireless telecommunications network having a circuit-switched portion and a General Packet Radio Service (GPRS) packet-switched portion. A prepaid subscriber class (PPSC) is stored in a home location register (HLR), and the PPSC is sent from the HLR to a serving mobile switching center (MSC) when the subscriber registers in the circuit-switched portion of the network. The PPSC is sent from the HLR to a serving GPRS support node (SGSN) when the subscriber registers in the packet-switched portion of the network. Also, the PPSC may be sent from the SGSN to a Gateway GPRS Support Node (GGSN) in order to indicate that the subscriber is a prepaid subscriber. When the mobile subscriber begins a packet-switched data session, the SGSN, GGSN, or both periodically send partial call data records (CDRs) to a prepaid center (PPC). When the mobile subscriber begins a circuit-switched call, the MSC periodically sends partial CDRs to the PPC. The PPC calculates in near real time, a new account balance for the prepaid subscriber. The current call is disconnected, and prepaid services are stopped when the account balance is reduced to zero.

11 Claims, 12 Drawing Sheets

| Field | Description |
|---|---|
| IMSI | International Mobile Subscriber Identity. |
| NSAPI | Network layer Service Access Point Identifier. |
| PDP Type | PDP type, e.g., X.25 or IP. |
| PDP Address | PDP address, e.g., an X.121 address. |
| Dynamic Address | Indicates whether PDP Address is static or dynamic. |
| QoS Profile Negotiated | The quality of service profile negotiated. |
| SGSN Address | The IP address of the SGSN currently serving this MS. |
| Access Point Name | The APN requested by the MS. |
| MNRG | Indicates whether the MS is marked as not reachable for GPRS at the HLR. |
| Recovery | Indicates if the SGSN is performing database recovery. |
| SND | GTP sequence number of the next downlink N-PDU to be sent to the MS. |
| SNU | GTP sequence number of the next uplink N-PDU to be received from the SGSN. |
| *Prepaid* | *Indicates whether Prepaid over GPRS is active.* |
| Charging Id | Charging identifier, identifies charging records generated by SGSN and GGSN. |
| Reordering Required | Specifies whether the GGSN shall reorder N-PDUs received from the SGSN. |

FIG. 5

| Field | Description |
|---|---|
| IMSI | IMSI is the main reference key. |
| MM State | Mobility management state, IDLE, STANDBY, or READY. |
| P-TMSI | Packet Temporary Mobile Subscriber Identity. |
| IMEI | International Mobile Equipment Identity |
| P-TMSI Signature | A signature used for identification checking purposes. |
| Routing Area | Current routing area. |
| Cell Identity | Current cell in READY state, last known cell in STANDBY or IDLE state. |
| Cell Identity Age | Time elapsed since the last LLC PDU was received from the MS at the SGSN. |
| VLR Number | The VLR number of the MSC/VLR currently serving this MS. |
| New SGSN Address | The IP address of the new SGSN where buffered and not sent N-PDUs should be forwarded to. |
| Authentication Triplets | Authentication and ciphering parameters. |
| Kc | Currently used ciphering key. |
| CKSN | Ciphering key sequence number of Kc. |
| Ciphering algorithm | Selected ciphering algorithm. |
| Radio Access Classmark | Ms radio access capabilities. |
| SGSN Classmark | MS network capabilities. |
| DRX Parameters | Discontinuous reception parameters. |
| MNRG | Indicates whether activity from the MS shall be reported to the HLR. |
| NGAF | Indicates whether activity from the MS shall be reported to the MSC/VLR. |
| PPF | Indicates whether paging for GPRS and non-GPRS services can be initiated. |
| MSISDN | The basic MSISDN of the MS. |
| SMS Parameters | SMS-related parameters, e.g., operator-determined barring. |
| Recovery | Indicates if HLR or VLR is performing database recovery. |

FIG. 6A

| | |
|---|---|
| Prepaid | Indicates whether Prepaid over GPRS is active. |
| Radio Priority SMS | The RLC/MAC radio priority level for uplink SMS transmission. |
| Each MM context contains zero or more of the following PDP contexts: ||
| PDP Context Identifier | Index of the PDP context. |
| PDP Type | PDP type, e.g., X.25 or IP. |
| PDP Address | PDP address, e.g., an X.121 address. |
| NSAPI | Network layer Service Access Point Identifier. |
| TI | Transaction Identifier. |
| PDP State | Packet data protocol state, INACTIVE or ACTIVE. |
| Access Point Name | The APN requested by the MS. |
| GGSN Address in Use | The IP address of the GGSN currently used by the activated PDP context. |
| VPLMN Address Allowed | Specifies whether the MS is Allowed to use the APN in the domain of the HPLMN only, or additionally the APN in the domain of the VPLMN. |
| QoS Profile Subscribed | The quality of service profile subscribed |
| QoS Profile Requested | The quality of service profile requested. |
| QoS Profile Negotiated | The quality of service profile negotiated. |
| Radio Priority | The RLC/MAC radio priority level for uplink user data transmission. |
| SND | GTP sequence number of the next downlink N-PDU to be sent to the MS. |
| SNU | GTP sequence number of the next uplink N-PDU to be sent to the GGSN. |
| Charging Id | Charging identifier, identifies charging records generated by SGSN and GGSN. |
| Reordering Required | Specifies whether the SGSN shall reorder N-PDUs before delivering the N-PDUs to the MS. |

PREPAID SUBSCRIBER SERVICE FOR PACKET-SWITCHED AND CIRCUIT-SWITCHED RADIO TELECOMMUNICATIONS NETWORKS

BACKGROUND OF THE INVENTION

1. Technical Field of the Invention

This invention relates to telecommunication systems and, more particularly, to a system and method of providing a prepaid subscriber service in a packet-switched radio telecommunications network and in an integrated circuit-switched and packet-switched radio telecommunications network.

2. Description of Related Art

Prepaid subscriber service is currently provided only in circuit-switched radio telecommunications networks. Prepaid service keeps track of an account balance for a subscriber and subtracts charges from the account balance as the subscriber uses phone service. In order to do this effectively, a technique for calculating charges in near real time is required. In this way, if the subscriber depletes his prepaid account balance, the network denies him access if he tries to make further calls. In addition, if the prepaid account balance is depleted during an ongoing call, and the subscriber does not hang up, the network disconnects the call.

There are several ways of providing near real time billing information in circuit switched networks. For designated prepaid subscribers, a Call Data Record (CDR) may be output either immediately after a call is disconnected or at periodic intervals during the call. A Subscriber Type field is defined in the subscriber record in the subscriber's Home Location Register (HLR) and is used to designate a prepaid subscriber. The Subscriber Type field is transferred to the Visitor Location Register (VLR) or Mobile Switching Center (MSC) serving the subscriber. The Subscriber Type field indicates to the serving node that the subscriber has a prepaid subscription.

Under regular billing procedures, a complete CDR is sent out at the end of a call to an associated storage system. CDRs are stored and accumulated there for a set amount of time which is configurable by the operator. For example, the call data records may be accumulated for 24 hours before being sent to a billing center where the subscriber is charged. For prepaid subscriber service, the process is accelerated in the circuit-switched network. The MSC recognizes the Subscriber Type field and provides partial CDRs during each call for the prepaid subscriber directly to a prepaid center, or through a billing gateway to the prepaid center. The amount of time between partial data records is configurable, for example, 5 minutes, 15 minutes, etc. Partial CDRs contain the same information as a complete CDR, but are sent out more rapidly and may cover only part of the call. The partial CDRs bypass the storage system so that charging information can be calculated in near real time.

The prepaid center includes rate information and converts call duration to a charge. It also subtracts the charges from the account balance as the call progresses in order to determine the subscriber's account balance in near real time. If the balance reaches zero and the call is still ongoing, the prepaid center sends an instruction to the HLR to remove the subscriber's subscription. This has the effect of disconnecting the call since it triggers the HLR to send a message to the MSC telling it that the subscription has been erased. The MSC then disconnects the call.

The existing method of providing prepaid service, however, has several disadvantages. First, the Subscriber Type field described above is a manufacturer's proprietary field which is recognized only by network nodes manufactured by the specific manufacturer implementing the field. A standardized method is needed. Second, the existing method has only been used in circuit-switched wireless networks, and there is no known method of providing prepaid subscriber service in a packet-switched network.

In order to overcome the disadvantage of existing systems, it would be advantageous to have a standardized system and method of providing prepaid subscriber service in both circuit-switched and packet-switched radio telecommunications networks. The present invention provides such a system and method.

SUMMARY OF THE INVENTION

In one aspect, the present invention is a method of providing a prepaid subscriber service to a mobile subscriber in a wireless packet-switched telecommunications network such as the General Packet Radio Service (GPRS). The method includes the steps of storing a prepaid subscriber class (PPSC) in a home location register (HLR) in the network, and sending the PPSC from the HLR to a Serving GPRS Service Node (SGSN) when the subscriber registers. When the subscriber begins a data session, the SGSN periodically sends partial call data records (CDRs) during the data session to a prepaid center (PPC). The partial CDRs may cover charges for radio network usage. A Gateway GPRS Service Node (GGSN) may send partial CDRs covering data network usage. This is followed by calculating in the PPC in near real time, a new account balance for the subscriber, and ending the data session when the account balance is reduced to zero.

In another aspect, the present invention is a method of providing a prepaid subscriber service to a mobile subscriber in an integrated wireless telecommunications network having a circuit-switched portion and a packet-switched portion. The method includes the steps of storing the PPSC in the HLR in the network, sending the PPSC from the HLR to an MSC serving the prepaid subscriber when the subscriber registers in the circuit-switched portion of the network, and sending the PPSC from the HLR to a packet-switched service node serving the prepaid subscriber when the subscriber registers in the packet-switched portion of the network. Also, the PPSC may be sent inter-nodally from one packet-switched node to another, for example, from a serving node to a gateway node, at a Packet Data Protocol (PDP) context activation. Upon beginning a circuit-switched call by the mobile subscriber, the MSC periodically sends partial CDRs to the PPC. Upon beginning a packet-switched data session by the mobile subscriber, the packet-switched service nodes, for example, both serving and gateway nodes, periodically send partial CDRs to the PPC. This is followed by calculating in the PPC in near real time, a new account balance for the prepaid subscriber, and stopping the prepaid subscriber service when the account balance is reduced to zero.

In yet another aspect, the present invention is a method of providing a prepaid subscriber service to a mobile subscriber in a wireless packet-switched telecommunications network which includes sending a Subscriber Type field in a message from the HLR to a packet-switched service node serving the mobile subscriber when the subscriber registers with the service node. Also, the Subscriber Type may be sent inter-nodally from one packet-switched node to another, for example, from the serving node to a gateway node, at a Packet Data Protocol (PDP) context activation. Upon beginning a packet-switched data session by the mobile subscriber, the packet-switched nodes, for example, both serving and gateway nodes, periodically send partial CDRs to the PPC. This is followed by calculating in the PPC in near real time, a new account balance for the subscriber, and ending the data session when the account balance is reduced to zero.

In a still further aspect, the present invention is directed to a method of providing a prepaid subscriber service to a mobile subscriber in an integrated wireless telecommunications network having a circuit-switched portion and a packet-switched portion. The method provides for creating in a home location register (HLR) in the network a subscription for at least one of a circuit-switched service and a packet-switched service, for the mobile subscriber. The method also creates in a prepaid center (PPC) an account for at least one of the circuit-switched service and the packet-switched service for the mobile subscriber. The method includes the step of sending a prepaid subscriber class (PPSC) in a message from the HLR to a Mobile Switching Center (MSC) serving the prepaid subscriber when the subscriber registers in the circuit-switched portion of the network. Further, when the subscriber registers in the packet-switched portion of the network, the prepaid subscriber class (PPSC) is sent via a message from the HLR to a serving packet-switched service node serving the prepaid subscriber. The PPSC may also be sent inter-nodally from one packet-switched node to another, for example, from the serving node to a gateway node, at a Packet Data Protocol (PDP) context activation. Upon beginning a packet-switched data session by the mobile subscriber, the packet-switched nodes, for example, both serving and gateway nodes, periodically send partial CDRs to the PPC. Also, upon beginning a circuit-switched call by the mobile subscriber, partial call data records (CDRs) are periodically sent from the MSC to the PPC. A new account balance for the prepaid subscriber's account is calculated in the PPC in near real time, and the method stops at least one of the circuit-switched service and the packet-switched service when the account balance is reduced to zero.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
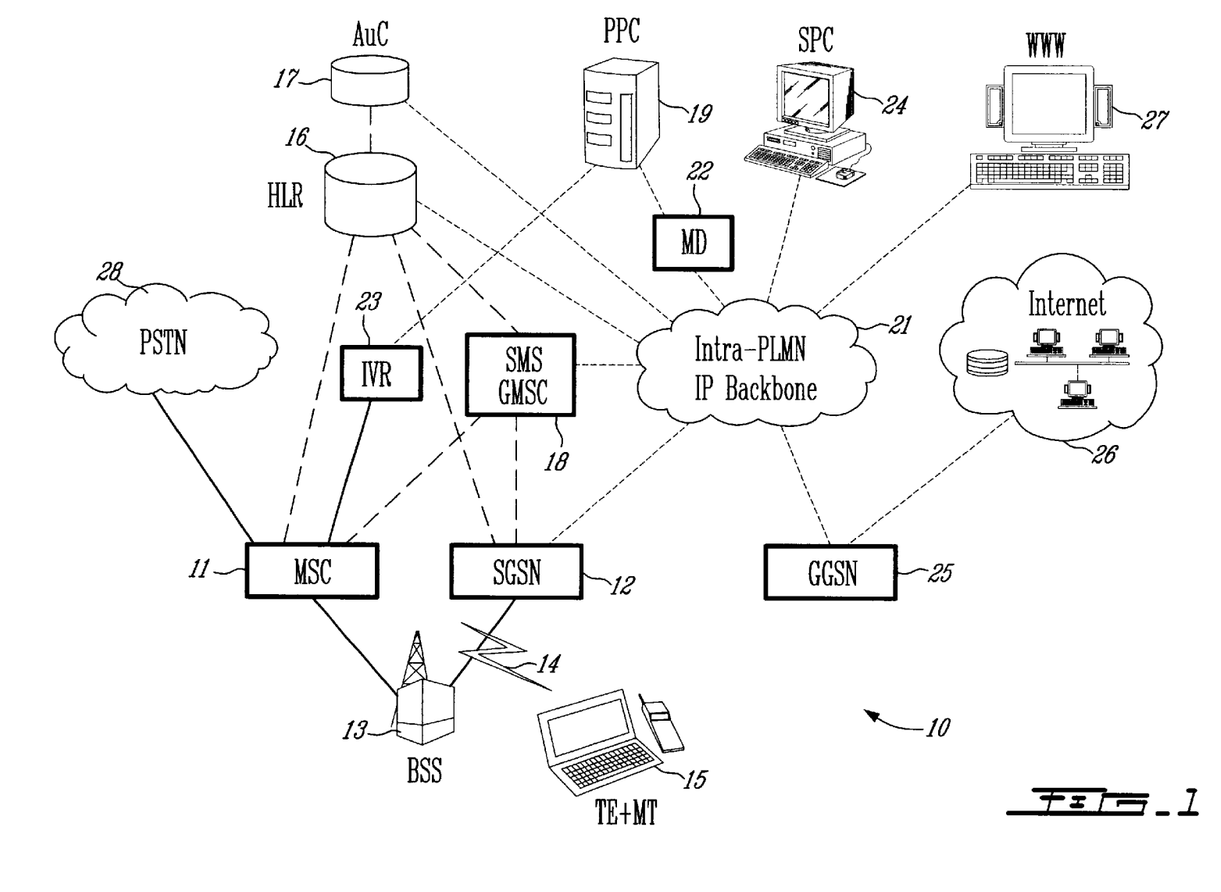
FIG. 1 is a simplified block diagram of a wireless network which implements a Prepaid Center (PPC) in an integrated network which combines a circuit-switched wireless network with a General Packet Radio Service (GPRS) packet-switched wireless network.

FIG. 1 is a simplified block diagram of an integrated wireless network (10) which combines a circuit-switched wireless network with a General Packet Radio Service (GPRS) packet-switched wireless network. Dotted lines between nodes represent Transmission Control Protocol/Internet Protocol (TCP/IP) connections while dashed lines represent Signaling System 7 (SS7) connections. Although the description herein specifically discusses a GPRS packet-switched wireless network as the preferred embodiment, the claimed invention is equally applicable to other packet-switched data networks.

A Mobile Switching Center (MSC) 11 and a Serving GPRS Support Node (SGSN) 12 are counterpart switching nodes in the circuit-switched network and the GPRS packet-switched network, respectively. The MSC and the SGSN are connected to a shared Base Station System (BSS) 13 which communicates over an air-interface radio link 14 with Terminal Equipment (TE) and Mobile Terminals (MT) 15. A Home Location Register (HLR) 16 is also shared between the circuit-switched and the packet-switched networks, and stores subscriber information which is utilized in both networks. An Authentication Center (AuC) 17 connected to or co-located with the HLR authenticates MTs that are attempting to access the network.

A Short Message Service Gateway Mobile Switching Center (SMS-GMSC) 18 provides SMS service to both networks. A Prepaid Center (PPC) 19 includes rate information and converts call duration to a charge. It also subtracts calculated charges from a prepaid subscriber's account balance as calls progress in order to determine the subscriber's account balance in near real time. For packet-switched data sessions, the PPC may also consider other factors such as, for example, the volume of data transmitted and the Quality of Service provided when determining the charge for a data session. Thus, a one-minute session in which 100 kilobytes of data are transmitted may be more expensive than a one-minute session in which only 10 kilobytes of data are transmitted. The PPC may also function as a SMS Service Center by sending short messages with a subscriber's account status to the SMS-GMSC.

The MSC 11, SGSN 12 or a Gateway GPRS Support Node (GGSN) 25 may be connected directly to the PPC through an Intra-PLMN IP Backbone 21 or through a Mediation Device (MD) 22. An Interactive Voice Response (IVR) device 23 may be implemented between the MSC 11 and the PPC. For mobile telecommunications networks such as the Global System for Mobile Communications (GSM), a SIM Personalization Center (SPC) 24 may be utilized to program SIM cards for use in MTs. The GGSN 25 is a gateway which links the integrated network with other systems such as the Internet 26. The Intra-PLMN IP Backbone 21 may also be utilized to connect the network with the World Wide Web (WWW) 27. Calls from the Public Switched Telephone Network (PSTN) 28 enter the network through the MSC 11.

The present invention applies not only to GSM/GPRS systems, but also to any mobile telecommunication system using GPRS Support Nodes as their packet-switched backbone. Thus, the GPRS Network Reference Model as specified in ETSI GSM 03.60 may be utilized for GSM/GPRS systems, and the GPRS Network Reference Model as specified in TIA/EIA SP-4027-932 may be utilized for TDMA/GPRS systems.

The present invention introduces a new subscriber class in the HLR 16 as described in Table 1 below rather than using the proprietary Subscriber Type field in the subscriber record. This new subscriber class defines in the HLR the prepaid capability of the subscriber for both packet-switched (PS) and circuit-switched (CS) services. With the implementation of this new class in the subscriber profile, the subscriber can have either a combined packet-switched and circuit-switched prepaid subscription, a separate circuit-switched subscription, or a separate packet-switched subscription.

TABLE 1

| Value | Description |
| --- | --- |
| 00 | No Prepaid Subscription |
| 01 | PS Prepaid Subscription Active |
| 10 | CS Prepaid Subscription Active |
| 11 | PS & CS Subscription Active |

Mobile subscribers may simultaneously subscribe to both circuit-switched and packet-switched services. These subscriptions may be structured as a single combined subscription, or as two independent subscriptions. If the subscriptions are combined, and the subscription is erased at either step 58 (FIG. 2) or step 112 (FIG. 7), then the subscriber loses both services. This embodiment requires that a combined account be created in the PPC 19, and that the proprietary Subscriber Type field be added to the subscriber record in the HLR 16. The field indicates a combined subscription, and when the balance in the subscriber's combined account is reduced to zero due to call activity in either the circuit-switched or the packet-switched portion of the network, both services are terminated. The Subscriber Type field has been used in circuit-switched networks, but its use in packet-switched networks is new.

Alternatively, the subscriptions may be structured as two independent subscriptions. In this case, two separate accounts are created for the subscriber in the PPC 19, one account for circuit-switched services, and one account for packet-switched services. If one of the subscriber's account balances is reduced to zero due to call activity in either the circuit-switched or the packet-switched portion of the network, only the service being utilized is lost. Thus, if the subscriber is conducting a data session and the packet-switched account balance reaches zero, the HLR 16 sends a message to the SGSN 12 indicating that the packet-switched subscription has been erased. This causes the SGSN to end the data session and stop providing packet-switched services until the subscription is restored. Circuit-switched services, however, are not affected. Likewise, if the subscriber is on a voice call and the circuit-switched account balance reaches zero, the HLR 16 sends a message to the MSC 11 indicating that the circuit-switched subscription has been erased. This causes the MSC to end the voice call and stop providing circuit-switched services until the subscription is restored. Packet-switched services, however, are not affected. This embodiment does not require use of the Subscriber Type field, but uses the prepaid subscriber class (PPSC) in the REGNOT Return Result message (for circuit-switched services) and in the Insert Subscriber Data Request and Create PDP Context Request messages (for packet-switched services).

In general, when a MT registers in the circuit-switched network, the MSC sends a REGNOT Invoke message to the HLR to obtain subscriber data. The HLR returns subscriber data to the MSC and includes the prepaid subscriber class (PPSC). Likewise, when a MT registers in the packet-switched GPRS network, the SGSN sends an Update Location message to the HLR. At registration, the HLR sends the prepaid subscriber class to the SGSN in the Insert Subscriber Data message. This information is forwarded to the GGSN at PDP Context Activation using the Create PDP Context Request message. The use of a standard subscriber class rather than adding a proprietary Subscriber Type field in the subscriber record improves interoperability among multiple vendors.

Figure 2:
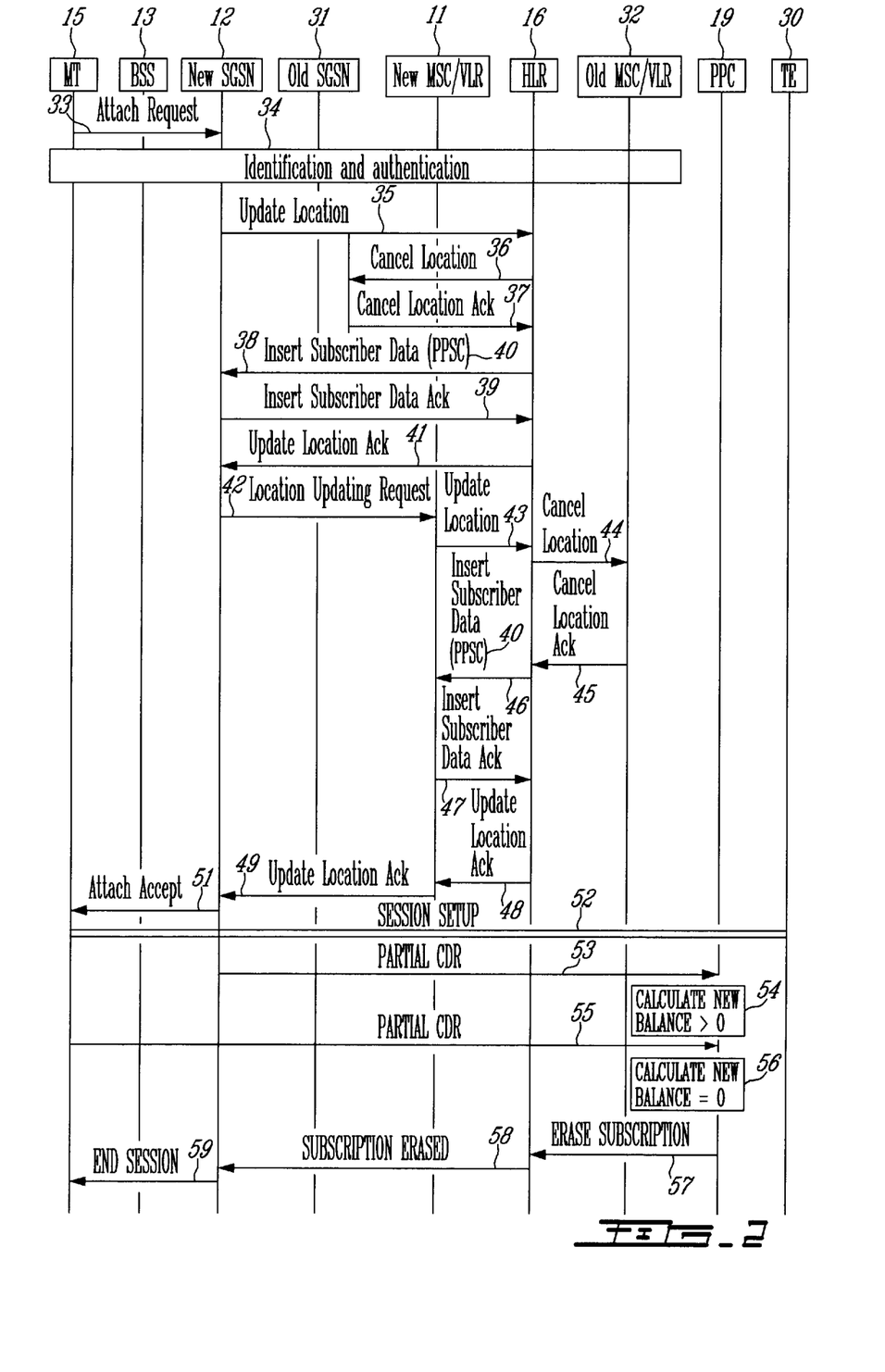
FIG. 2 is a message flow diagram illustrating the flow of messages between network nodes during a combined GPRS/IMSI Attach procedure followed by a data session by a prepaid subscriber in the GPRS portion of the integrated wireless network of FIG. 1.
Figure 3:
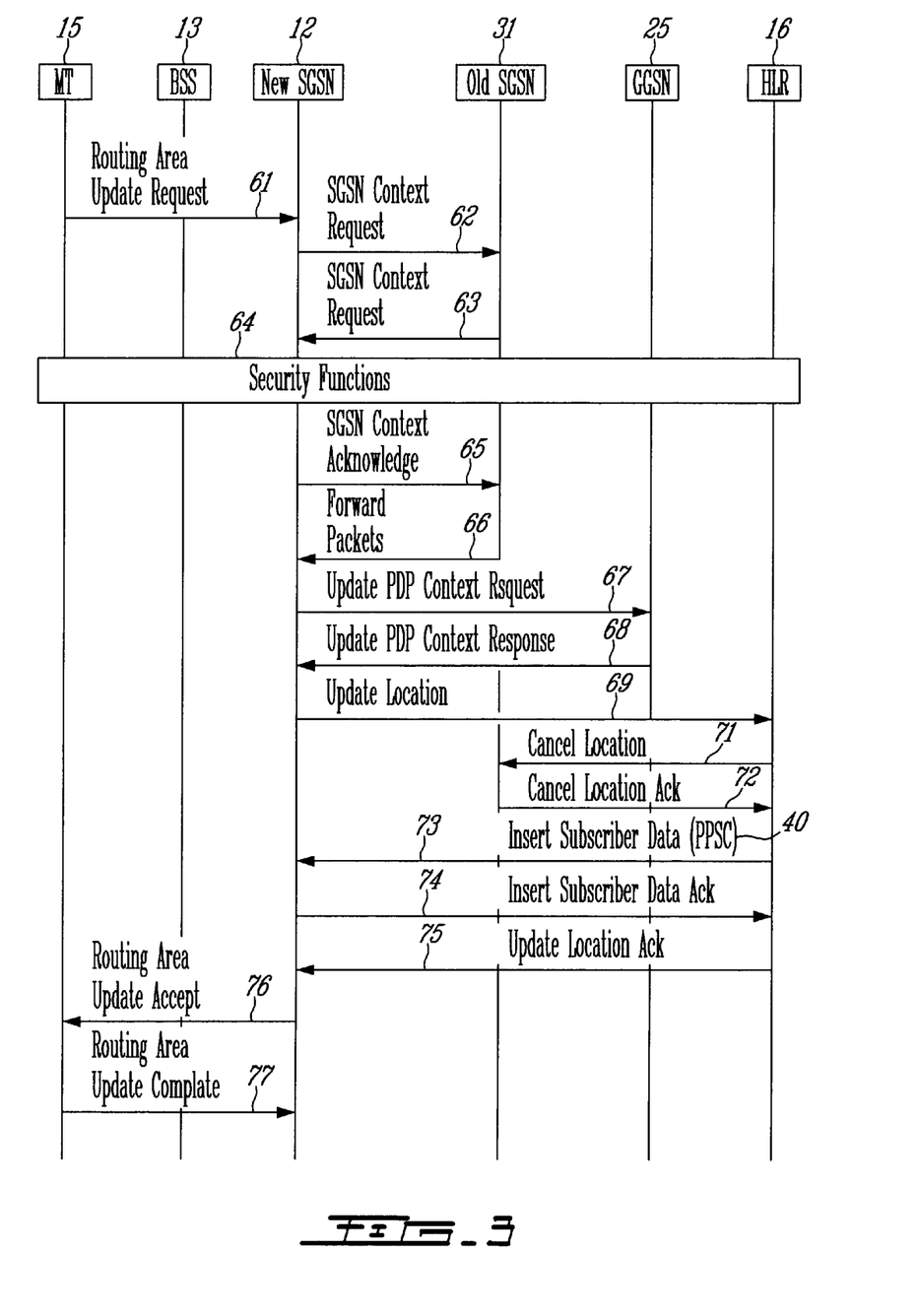
FIG. 3 is a message flow diagram illustrating the flow of messages between network nodes during an Inter-SGSN Routing Area Update procedure.

FIGS. 2 and 3 illustrate message flows in a GSM/GPRS system. FIG. 2 is a message flow diagram illustrating the flow of messages between network nodes during a combined GPRS/IMSI Attach procedure followed by a data session by a prepaid subscriber in the GPRS portion of the integrated wireless network of FIG. 1. The session is conducted between the MT 15 and Terminal Equipment (TE) 30 located in a data network. At step 33, an Attach Request is sent from the mobile terminal 15 to the New SGSN 12. Then at 34, the network performs identification and authentication procedures. At 35, the New SGSN sends an Update Location message 35 to the HLR 16. The HLR then sends at 36, a Cancel Location message to the Old SGSN. The Old SGSN returns a Cancel Location Acknowledgment 37. The HLR then sends an Insert Subscriber Data message 38 to the New SGSN and includes the Prepaid Subscriber Class (PPSC) 40. The New SGSN returns an Insert Subscriber Data Acknowledgment 39 to the HLR. The HLR then sends an Update Location Acknowledgment 41 to the New SGSN.

At step 42, the New SGSN 12 sends a Location Updating Request to the New MSC/VLR 11. The New MSC/VLR sends an Update Location message 43 to the HLR 16 which in turn sends a Cancel Location message 44 to an Old MSC/VLR 32. The Old MSC/VLR returns a Location Acknowledgment 45 to the HLR. The HLR then sends an Insert Subscriber Data message 46 to the New MSC/VLR and includes the PPSC 40. The New MSC/VLR returns an Insert Subscriber Data Acknowledgment 47 to the HLR. The HLR then sends a Location Acknowledgment 48 to the New MSC/VLR. The New MSC/VLR sends an Update Location Acknowledgment 49 to the New SGSN. The New SGSN then sends an Attach Accept message 51 to the mobile terminal 15.

A data session is then set up following known GPRS procedures at 52. The New SGSN 12, in response to receiving the PPSC starts sending partial CDR's 53 to the PPC 19. Upon receipt of each partial CDR, the PPC calculates a new balance in the Prepaid Subscriber's account at 54, and determines whether the account balance is greater than zero (0). This continues until a partial CDR 55 is received in the PPC, and calculations at 56 show that the Prepaid Subscriber's account balance is equal to zero. The PPC then sends a message 57 to the HLR 16 with an indication to erase the Prepaid Subscriber's subscription. The HLR in turn sends a message to the New SGSN 12 indicating that the subscription has been erased. The New SGSN then ends the session with the mobile terminal at 59.

FIG. 3 is a message flow diagram illustrating the flow of messages between network nodes during an Inter-SGSN Routing Area Update procedure. At 61, the mobile terminal 15 sends a Routing Area Update Request to the New SGSN 12. The New SGSN sends an SGSN Context Request message 62 to the Old SGSN 31 which returns an SGSN Context Request message at 63. At 64, the network performs security functions. At 65, the New SGSN sends an SGSN Context Acknowledgment to the Old SGSN. At 66 the Old SGSN then forwards packets to the New SGSN. At 67, the New SGSN sends an Update Packet Data Protocol (PDP) Context Request to the GGSN 25 which returns an Update PDP Context Response 68 to the New SGSN. The SGSN then sends an Update Location message 69 to the HLR 16. The HLR sends a Cancel Location message 71 to the Old SGSN which returns a Cancel Location Acknowledgment 72.

At 73, the HLR 16 sends an Insert Subscriber Data message to the New SGSN 12, and includes the PPSC 40. The New SGSN then returns an Insert Subscriber Data Acknowledgment 74 to the HLR. The HLR then sends an Update Location Acknowledgment 75 to the New SGSN. The NEW SGSN then sends a Routing Area Update Accept message 76 to the mobile terminal 15. The mobile terminal returns a Routing Area Update Complete message 77 to the New SGSN, and the process is complete.

Thus, the Insert Subscriber Data message 73 is modified in order to carry the new prepaid subscriber class (PPSC) 40. The impacts are similar for the Combined Routing Area/Location Area Update in the case of the Inter-SGSN Routing Area Update procedure where both Insert Subscriber Data messages carry the PPSC to the New SGSN and the New MSC/VLR.

Figure 4:
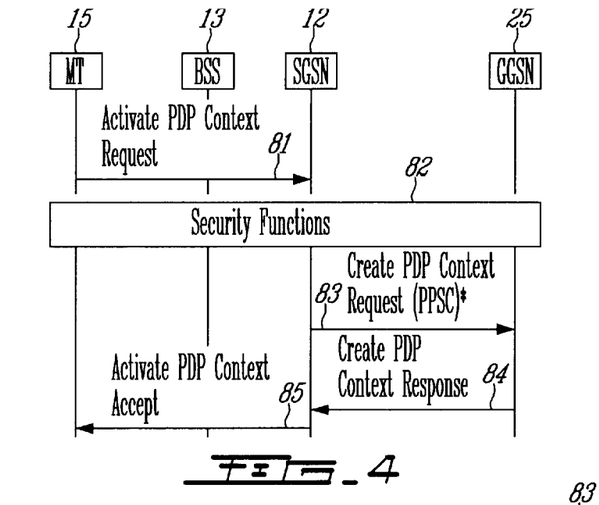
FIG. 4 is a message flow diagram illustrating the flow of messages between network nodes during a Packet Data Protocol (PDP) Context Activation procedure.

FIG. 4 is a message flow diagram illustrating the flow of messages between network nodes during a PDP Context Activation procedure. FIG. 4 is applicable to both GSM/GPRS and TDMA/GPRS systems. At step 81, the mobile terminal 15 sends an Activate PDP Context Request message to the SGSN 12. The network then performs security functions at 82. At 83, the SGSN sends a Create PDP Context Request message to the GGSN 25 and includes the PPSC 40. After the GGSN 25 receives the PPSC in the Create PDP Context Request message, it is aware that the subscriber has a prepaid service and that it can start generating partial CDRs now and send them to the PPC as appropriate. At 84, the GGSN returns a Create PDP Context Response message to the SGSN. The SGSN then sends an Activate PDP Context Accept message 85 to the mobile terminal 15, and the process is complete.

Figure 5:
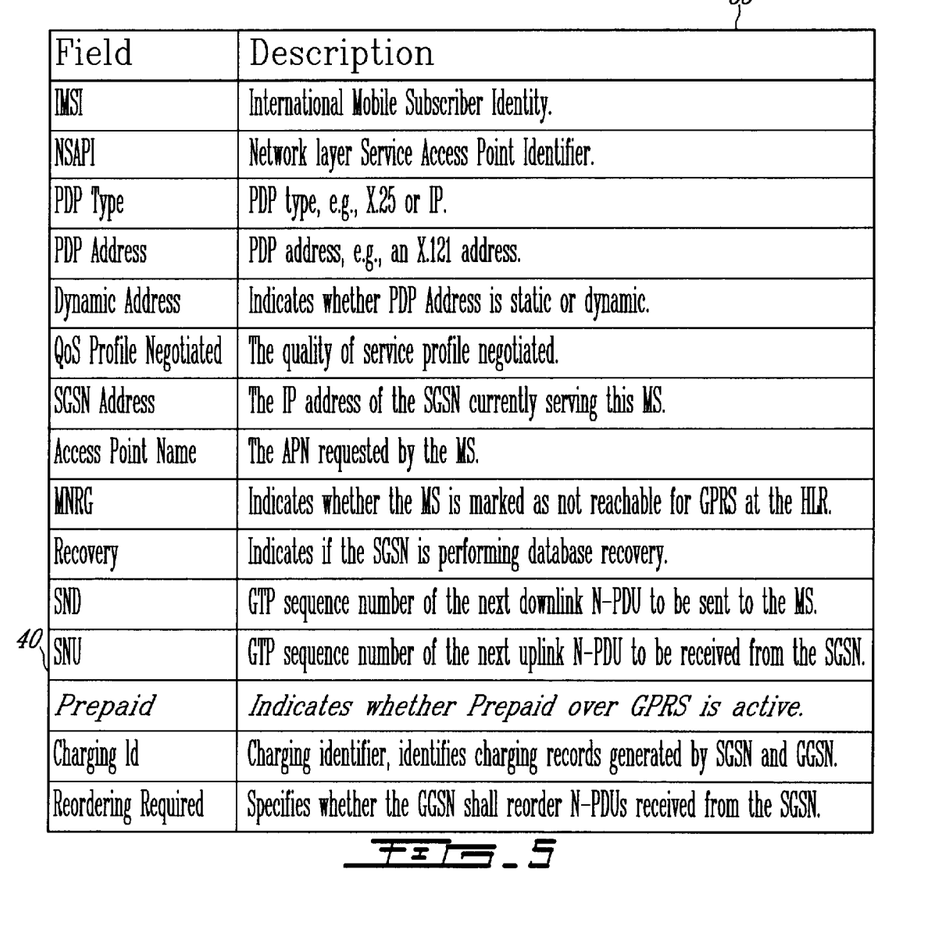
FIG. 5 is a table illustrating the fields included in the Create PDP Context Request sent from the SGSN to the GGSN in the PDP Context Activation procedure of FIG. 4.

FIG. 5 is a table illustrating the fields stored in the GGSN 25 for one PDP context. Prepaid Subscriber Class (PPSC or Prepaid) 40 is a new field indicating a subscriber's prepaid status.

Figure 6A:
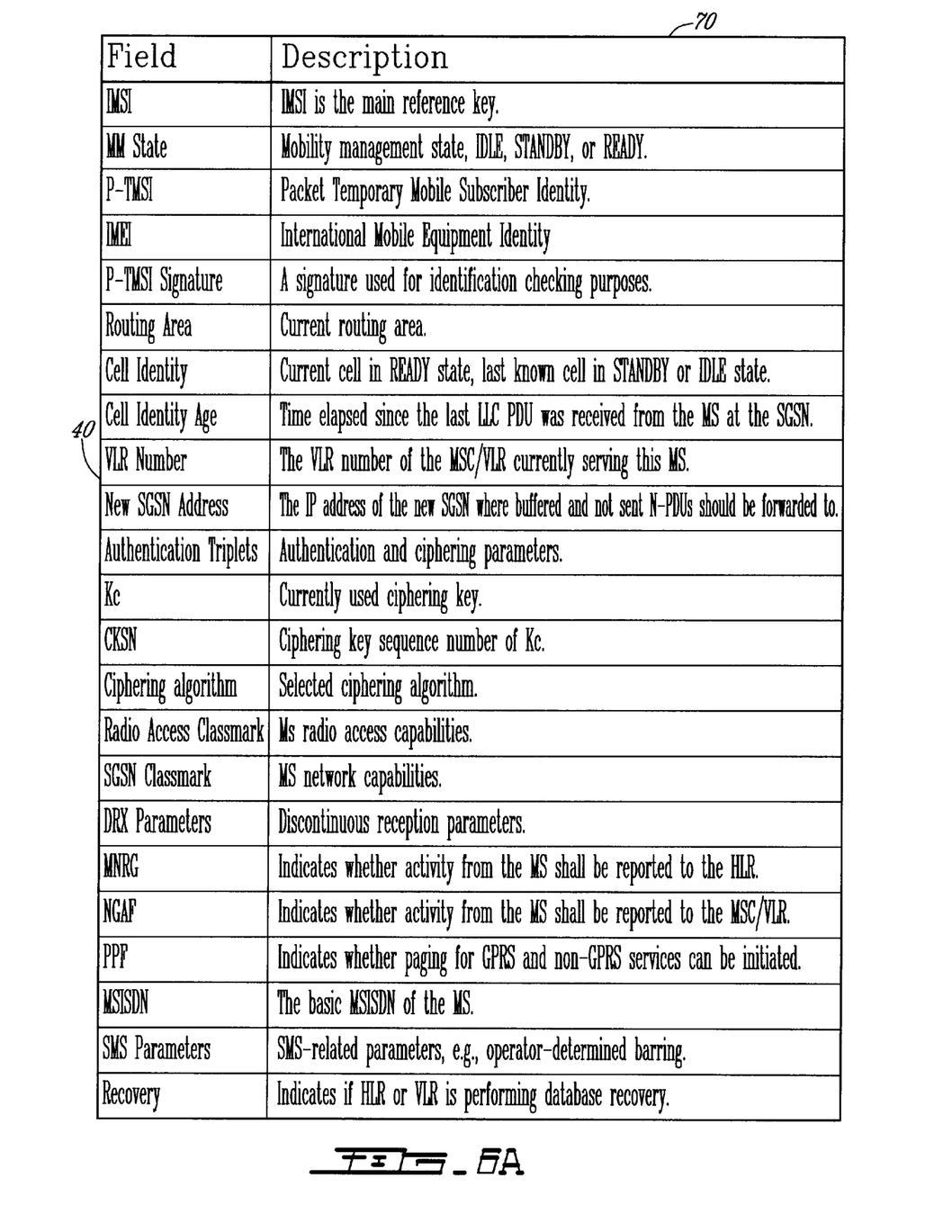
FIG. 6 is a table illustrating the fields passed from the HLR to the SGSN during the Insert Subscriber Data operation.
Figure 6B:
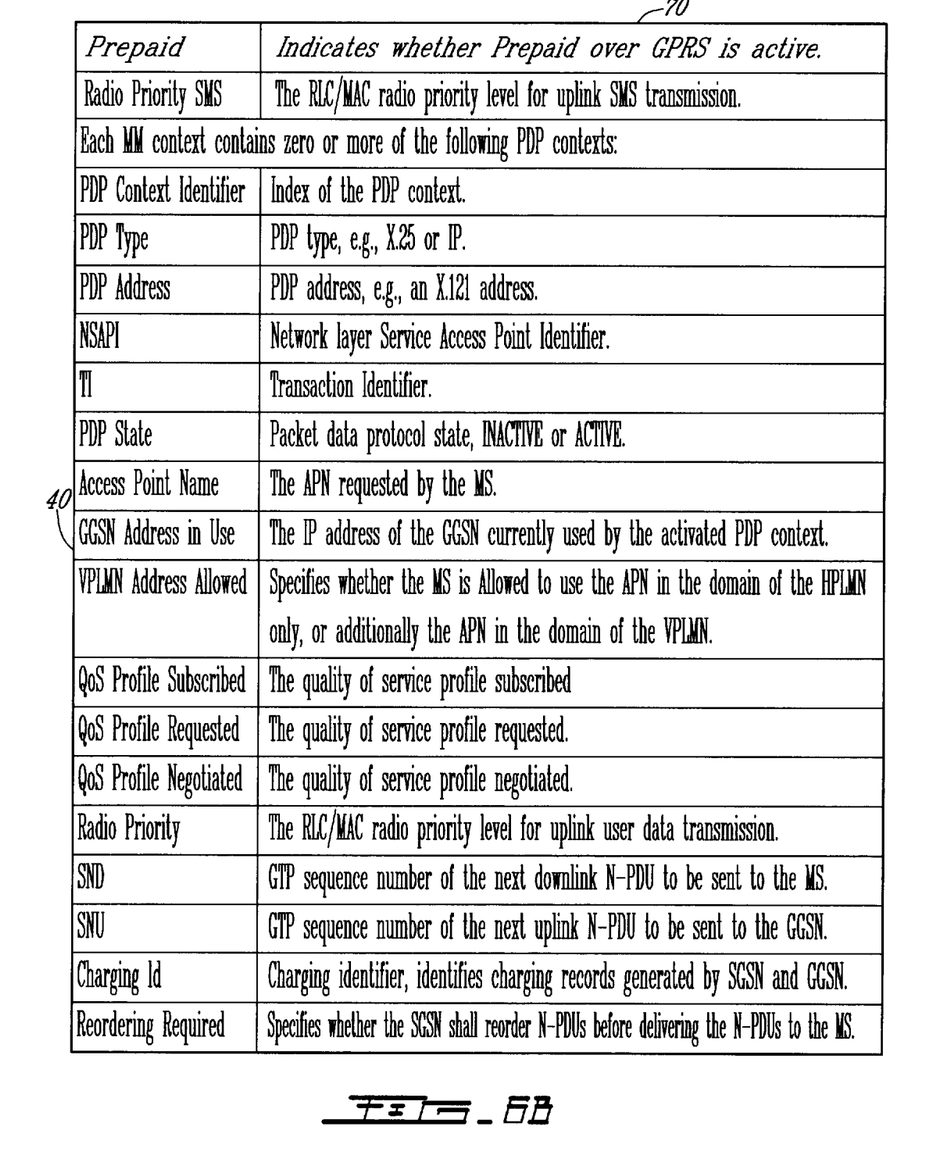

FIG. 6 is a table illustrating the Mobility Management and PDP Context information fields stored in the SGSN 12 for an MS in standby and ready state, provided in accordance with the teachings of the present invention.

Figure 7:
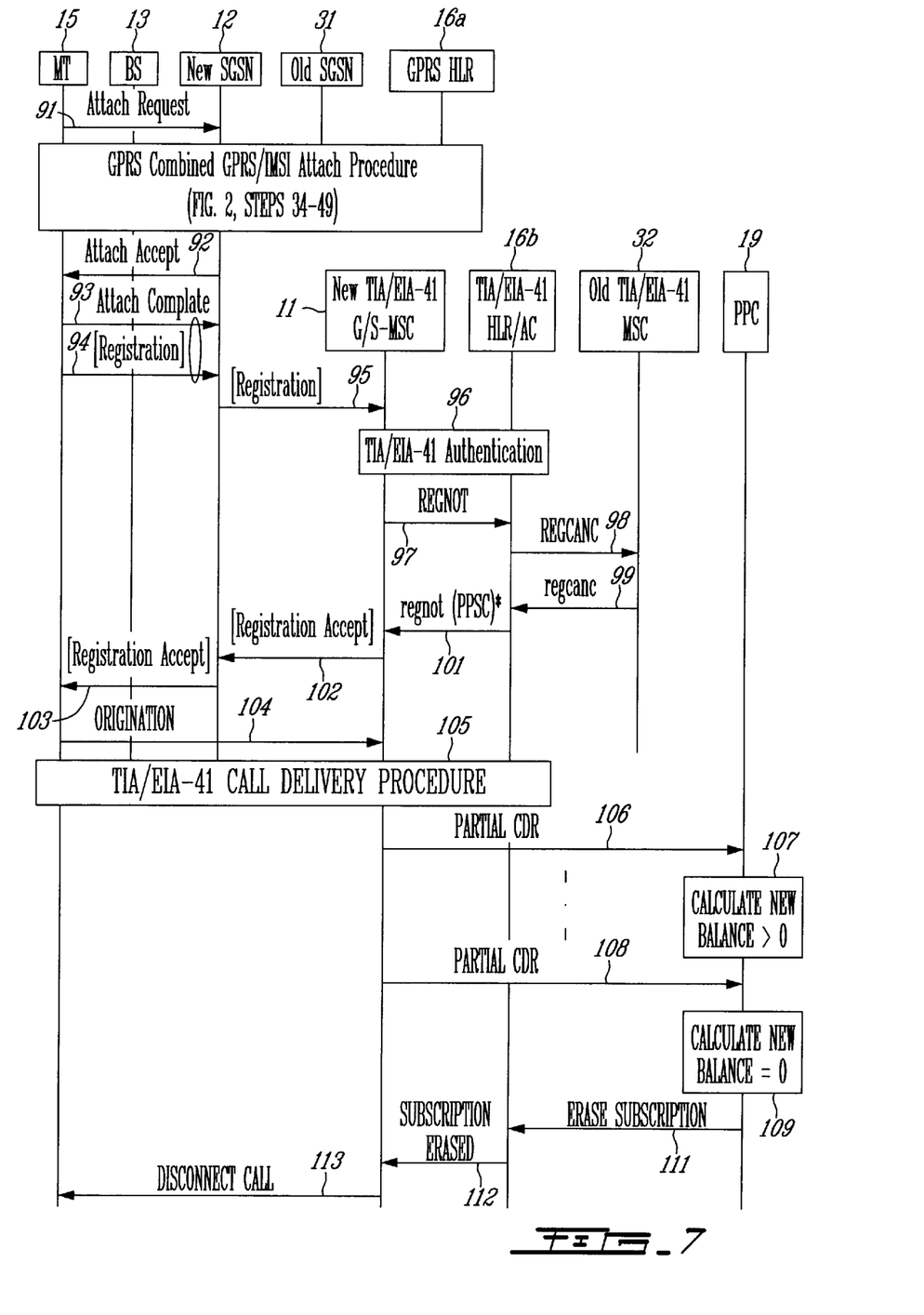
FIG. 7 is a message flow diagram illustrating the flow of messages between network nodes during a GPRS Attach and TIA/EIA-136 Registration procedure followed by a call by a prepaid subscriber in the circuit-switched portion of the integrated wireless network of FIG. 1.
Figure 8:
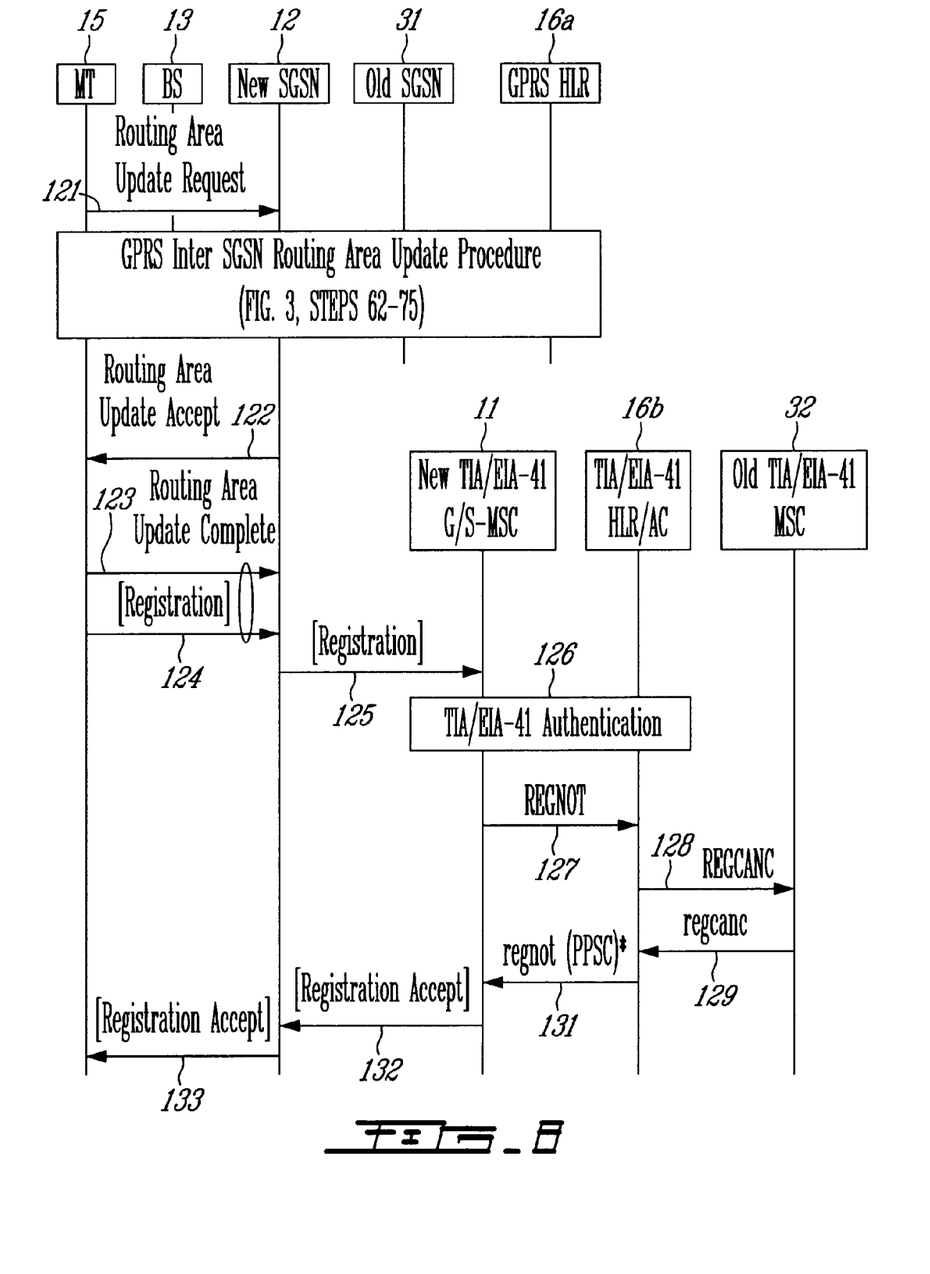
FIG. 8 is a message flow diagram illustrating the flow of messages between network nodes during an Inter-SGSN Re-Selection procedure.

FIGS. 7 and 8 illustrate message flows utilizing ANSI-41 signaling in TDMA/GPRS systems. The TDMA system modifications are similar to those made in GSM systems. The TDMA Wireless Systems specification (SP-4027-932) uses the same GSM Mobile Application Part (MAP) operations (i.e., Insert Subscriber Data procedure) between the SGSN and the GPRS HLR. The primary modification is in the ANSI-41 Registration Notification (REGNOT) and Qualification Request (QUALREQ) operations where the new PPSC 40 is included in the REGNOT and QUALREQ Return Result messages.

FIG. 7 is a message flow diagram illustrating the flow of messages between network nodes during a GPRS Attach and TIA/EIA-136 Registration procedure followed by a call by a prepaid subscriber in the circuit-switched portion of the integrated wireless network of FIG. 1. At step 91, the mobile terminal 15 sends an Attach Request message to the New SGSN 12. The network then performs the combined GPRS/IMSI Attach procedure shown in FIG. 2, steps 34 through 49. At 92, the New SGSN returns an Attach Accept message to the mobile terminal. The mobile terminal returns an Attach Complete message 93 to the New SGSN, and at some later time initiates a Registration at 94.

The new SGSN 12 forwards the Registration at 95 to the New MSC 11 which may be a TIA/EIA-41 gateway or serving (G/S) MSC. The New MSC and the TIA/EIA-41 HLR/AC 16b then perform authentication procedures at step 96. The New MSC then sends a Registration Notification (REGNOT) Invoke message 97 to the HLR/AC. The HLR/AC sends a Registration Cancellation (REGCANC) Invoke message 98 to the mobile terminal's previously serving (Old) MSC 32. The old MSC then sends a REGCANC Return Result message 99 to the HLR/AC. The HLR/AC sends a REGNOT Return Result message 101 to the new MSC and includes the PPSC 40. The New MSC sends a Registration Accept message 102 to the New SGSN 12 which forwards the Registration Accept message at 103 to the mobile terminal 15.

At a later time, the mobile terminal 15 originates a call at 104. The network then performs call delivery procedures as known in TIA/EIA-41. The New MSC 11 begins sending partial CDRs 106 to the PPC 19 in response to receiving the PPSC 40. At 107, the PPC calculates a new account balance for the prepaid subscriber and determines that the balance is greater than zero. At 108, a partial CDR is received in the PPC, and at 109, calculations show that the prepaid subscriber's balance is equal to zero. The PPC then sends a message 111 to the HLR/AC 16b indicating that the prepaid subscriber's subscription should be erased. At 112, the HLR/AC sends a message to the New MSC indicating that the subscription has been erased. The New MSC then disconnects the call with the mobile terminal at 113, and the process is complete.

FIG. 8 is a message flow diagram illustrating the flow of messages between network nodes during an Inter-SGSN Re-Selection procedure. At step 121, the mobile terminal 15 sends a Routing Area Update Request message to the New SGSN 12. The network then performs the GPRS Inter-SGSN Routing Area Update procedure shown in FIG. 3, steps 62 through 75. At 122, the New SGSN returns a Routing Area Update Accept message to the mobile terminal. The mobile terminal returns a Routing Area Update Complete message 123 to the New SGSN, and at some later time initiates a Registration at 124.

The new SGSN 12 forwards the Registration at 125 to the New MSC 11 which may be a TIA/EIA-41 G/S-MSC. The New MSC and the TIA/EIA-41 HLR/AC 16b then perform authentication procedures at step 126. The New MSC then sends a Registration Notification (REGNOT) Invoke message 127 to the HLR/AC. The HLR/AC sends a Registration Cancellation (REGCANC) Invoke message 128 to the mobile terminal's previously serving (Old) MSC 32. The old MSC then sends a REGCANC Return Result message 129 to the HLR/AC. The HLR/AC sends a REGNOT Return Result message 131 to the new MSC and includes the PPSC 40. The New MSC sends a Registration Accept message 132 to the New SGSN 12 which forwards the Registration Accept message at 133 to the mobile terminal 15.

Thus, the ANSI-41 REGNOT Return Result message is modified to carry the new PPSC 40 for the GPRS Attach-TIA/EIA-136 Registration and for the Inter-SSGN Re-Selection procedures.

Figure 9:
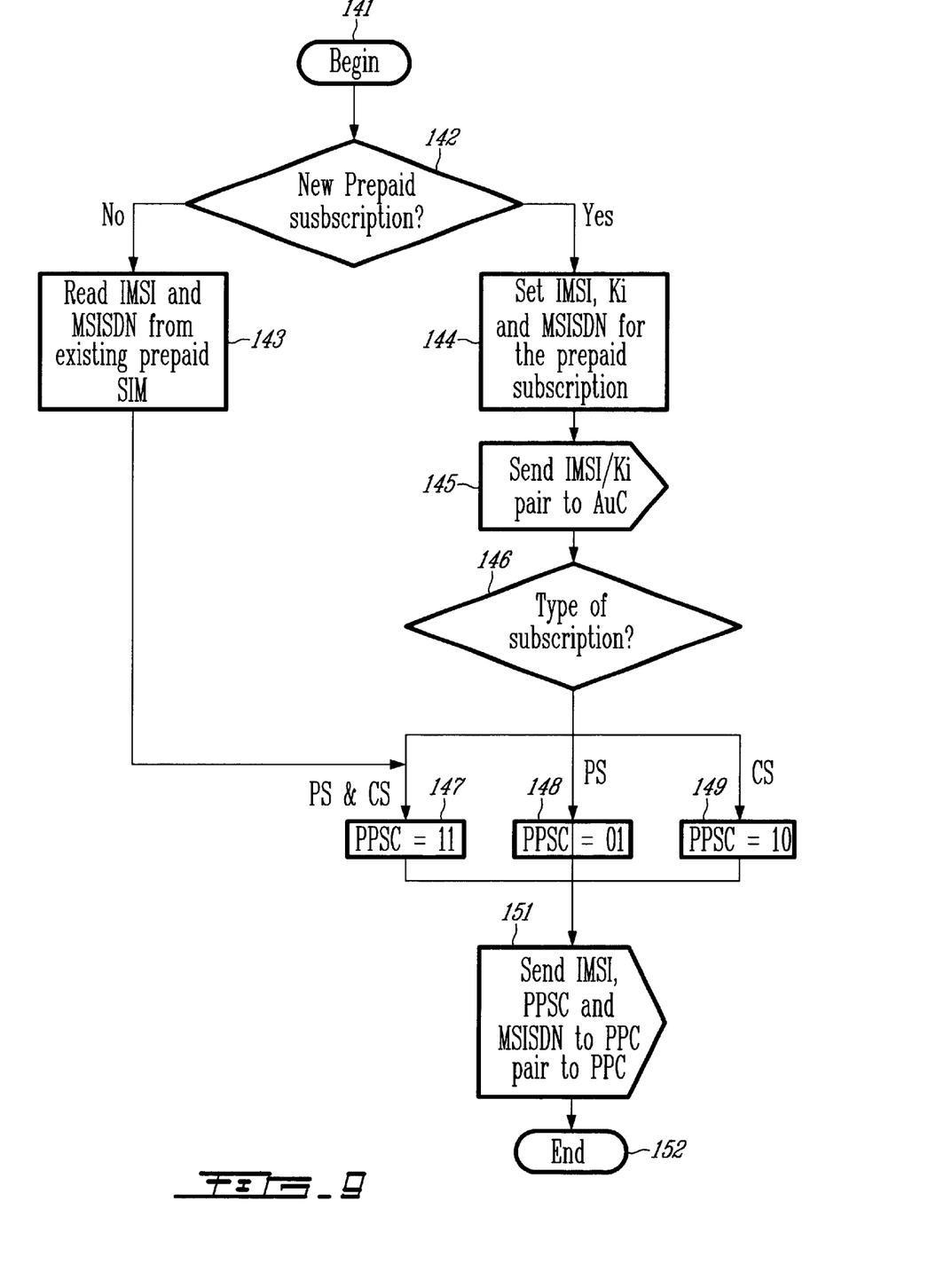
FIG. 9 is a flow chart illustrating the steps of the present invention when creating a Prepaid Subscription in the SIM Personalization Center (SPC)

FIG. 9 is a flow chart illustrating the steps of the present invention when creating a Prepaid Subscription in the SIM Personalization Center (SPC) 24. The process begins at step 141 and proceeds to step 142 where it is determined whether or not the prepaid subscription is a new prepaid subscription. If not, the process moves to step 143 where the SPC 24 reads the International Mobile Station Identifier (IMSI) and Mobile Station Integrated Services Digital Network (MSISDN) from the existing prepaid SIM card. The process then proceeds to step 147 where the PPSC is set equal to 11, indicating a combined packet-switching and circuit-switching subscription.

If the prepaid subscription is a new subscription at 142, the process moves to step 144 where the SPC 24 sets the IMSI, Individual Subscriber Authentication Key (Ki), and MSISDN for the prepaid subscription. The process then moves to 145 where the SPC sends the IMSI/Ki pair to the Authentication Center (AuC) 17. At 146, the type of prepaid subscription is determined. If the subscription is a combined packet-switching and circuit-switching subscription, the process moves to 147 and sets the PPSC equal to 11. If the subscription is for packet-switching services only, the process moves to step 148 and sets the PPSC equal to 01. If the prepaid subscription is for circuit-switching services only, the process moves to step 149 and sets the PPSC equal to 10. In all cases, the process then moves to step 151 where the SPC sends the IMSI, PPSC, and MSISDN to the PPC 19. The process ends at 152.

Figure 10:
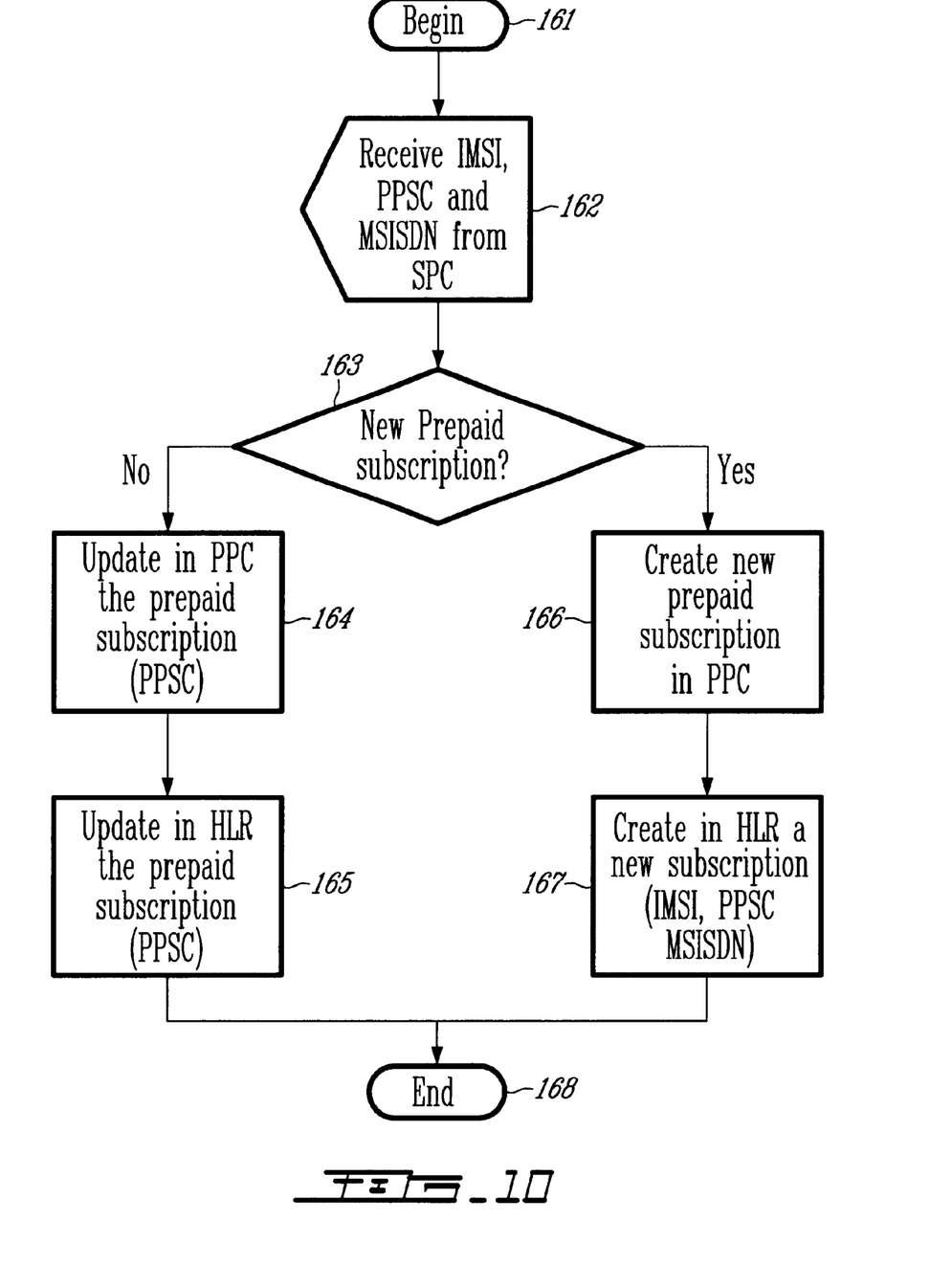
FIG. 10 is a flow chart illustrating the steps of the present invention when creating or updating a Prepaid Subscription in the PPC and the HLR.

FIG. 10 is a flow chart illustrating the steps of the present invention when creating or updating a Prepaid Subscription in the PPC 19 and the HLR 16. The process begins at 161 and moves to 162 were the PPC 19 receives the IMSI, PPSC, and MSISDN from the SPC 24. At 163, it is determined whether or not the subscription is a new prepaid subscription. If not, the process moves to 164 where the prepaid subscription (PPSC) is updated in the PPC. At 165, the prepaid subscription (PPSC) is updated in the HLR. The process then ends at 168. However, if it is determined at 163 that the subscription is a new prepaid subscription, the process moves to step 166 where a new prepaid subscription is created in the PPC 19. The process then moves to step 167 where a new subscription is created in the HLR, including the IMSI, PPSC, and MSISDN. The process then ends at 168.

Figure 11:
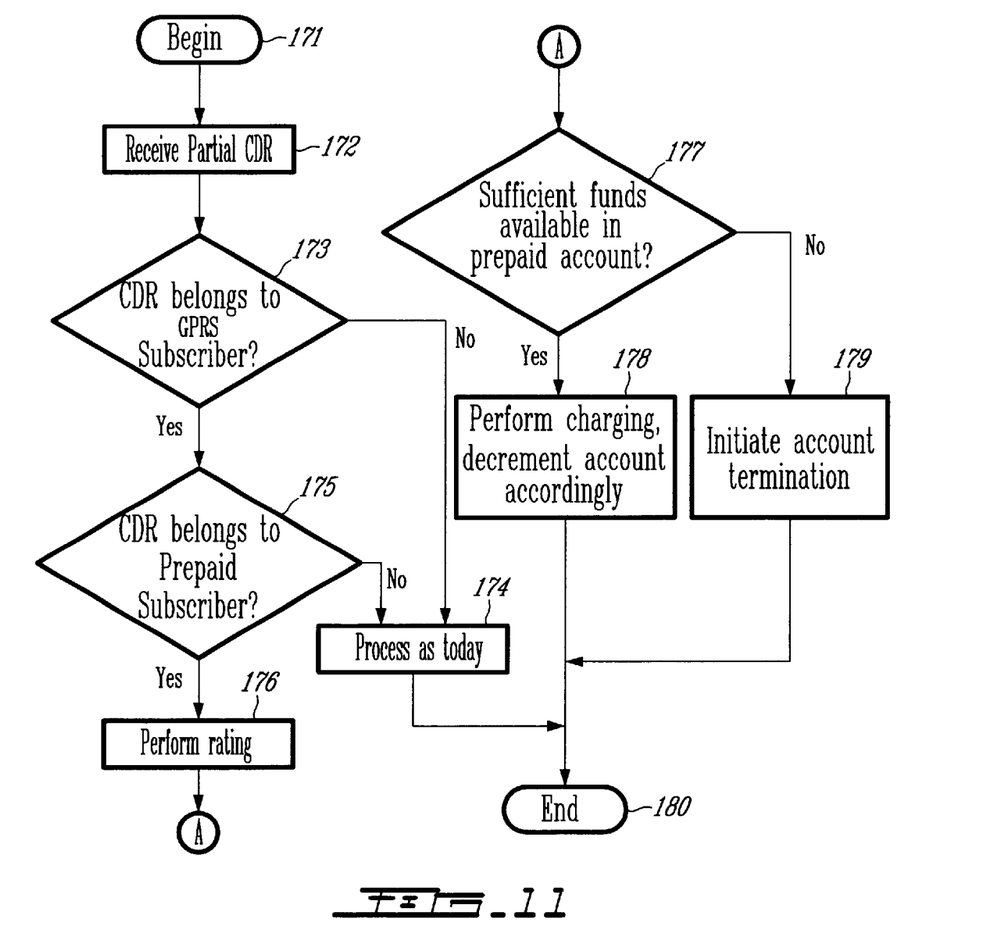
FIG. 11 is a flow chart illustrating the steps taken by the PPC when partial CDRs are received for a prepaid subscriber.

FIG. 11 is a flow chart illustrating the steps taken by the PPC when partial CDRs are received for a prepaid subscriber. The process begins at step 171 and moves to step 172 where a partial CDR is received in the PPC 19. At step 173, the PPC determines whether or not the CDR belongs to a GPRS subscriber. If not, the process moves to step 174 were the CDR is processed using existing procedures. If the CDR belongs to a GPRS subscriber, the process moves to step 175 where it is determined whether or not the CDR belongs to a prepaid subscriber. If not, the process returns to step 174 where the CDR is processed using existing procedures. If the CDR belongs to a prepaid subscriber, the process moves to step 176 where the CDR is rated.

The process next moves to step 177 where it is determined whether or not sufficient funds are available in the subscriber's prepaid account. If so, the process moves to step 178 where the PPC charges the account and decrements the account accordingly. The PPC calculates the charges from the information in the partial CDR, and subtracts the charges from the subscriber's account balance in order to determine a new account balance in near real time. As long as the balance is greater than zero (0), no further action is taken by the PPC. Thus, as additional partial CDRs are received by the PPC, the PPC calculates the new balance and determines that the balance is greater than zero. If, however, it is determined at 177 that there are not sufficient funds available in the subscriber's prepaid account to cover the charges in a partial CDR, the process moves to step 179 where the PPC initiates an account termination procedure. As noted above, the account may be terminated by sending a message from the PPC to the HLR to erase the subscriber's subscription. Alternatively, the PPC may inform the HLR that the subscriber's balance is zero, and the HLR may determine from internal logic to notify the MSC or SGSN that the subscription has been erased. The subscription may not actually be erased in the HLR. The process then ends at step 180.

Figure 12:
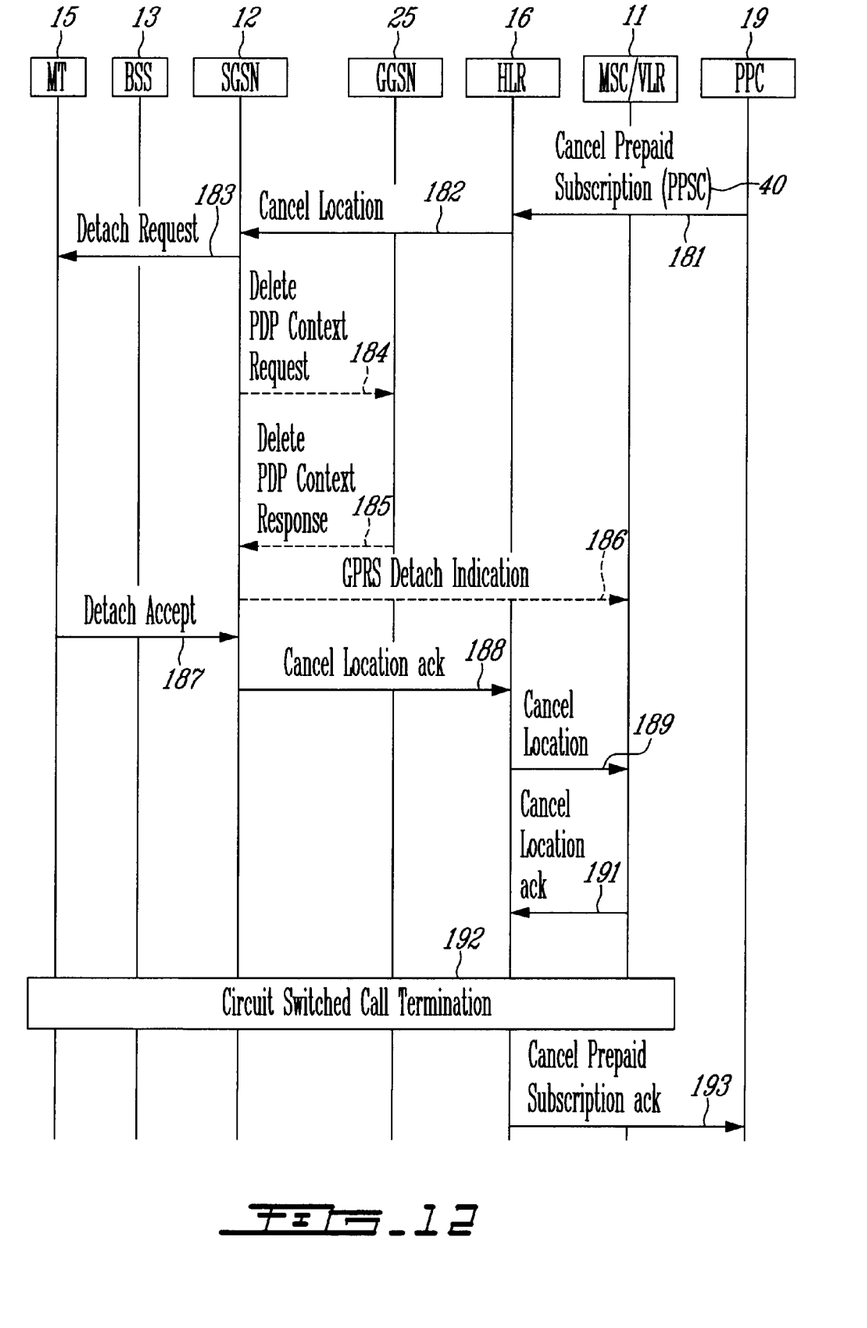
FIG. 12 is a message flow diagram illustrating the flow of messages between network nodes when terminating a Prepaid Subscription.

FIG. 12 is a message flow diagram illustrating the flow of messages between network nodes when terminating a Prepaid Subscription. At step 181, the PPC 19 sends a Cancel Prepaid Subscription message to the HLR 16 and includes the PPSC 40. The HLR then sends a Cancel Location message 182 to the SGSN 12. The SGSN sends a Detach Request message 183 to the mobile terminal 15. At step 184, the SGSN sends a Delete PDP Context Request message to the GGSN 25 which responds with a Delete PDP Context Response message 185. At 186, the SGSN sends a GPRS Detach Indication to the MSC/VLR 11.

At 187, the mobile terminal 15 sends a Detach Accept message to the SGSN 12. The SGSN sends a Cancel Location Acknowledgment 188 to the HLR 16. The HLR then sends a Cancel Location message 189 to the MSC/VLR 11, and at 191, the MSC/VLR returns a Cancel Location Acknowledgment to the HLR. At 192, the circuit-switched call is then terminated. Finally, at 193, the HLR sends a Cancel Prepaid Subscription Acknowledgment to the PPC 19, and the process is complete.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A method of providing a prepaid subscriber service to a mobile subscriber in a wireless packet-switched telecommunications network, said method comprising the steps of:

storing a prepaid subscriber class (PPSC) in a home location register (HLR) in the network;

sending the PPSC from the HLR to a service node serving the mobile subscriber when the subscriber registers with the service node;

sending a Packet Data Protocol (PDP) activation request from the mobile subscriber to the service node;

sending the PPSC from the service node to a gateway service node when the PDP activation request is received in the service node;

beginning a data session by the subscriber;

in response to the PPSC, periodically sending partial call data records (CDRs) during the data session from at least one of the service node and the gateway service node to a prepaid center (PPC);

calculating in the PPC in near real time, a new account balance for the subscriber; and ending the data session when the account balance is reduced to zero.

2. The method of providing a prepaid subscriber service of claim 1, wherein the step of peodically sending partial CDRs during the data session from the at least one of the service node and the gateway service node to the PPC includes sending partial CDRs covering charges for radio network usage, and the method further comprises periodically sending gateway partial CDRs during the data session from the gateway service node to the PPC, the gateway partial CDRs covering charges for data network usage.

3. The method of providing a prepaid subscriber service of claim 1 wherein the step of ending the data session includes the steps of:

sending a first message from the PPC to the HLR to erase the subscriber's subscription;

sending a second message from the HLR to the service node notifying the service node that the subscriber's subscription has been erased; and ending the session by the service node in response to the second message.

4. The method of providing a prepaid subscriber service of claim 1 wherein the step of ending the data session includes the steps of:

sending a first message from the PPC to the HLR indicating the account balance is zero;

determining in the HLR to send a second message from the HLR to the service node notifying the service node that the subscriber's subscription has been erased; and ending the session by the service node in response to the second message.

5. The method of providing a prepaid subscriber service of claim 4 wherein the step of determining in the HLR to send a second message from the HLR to the service node notifying the service node that the subscriber's subscription has been erased includes the steps of:

retaining the subscriber's subscription in the HLR; and falsely notifying the service node that the subscriber's subscription has been erased.

6. A method of providing a prepaid subscriber service to a mobile subscriber in an integrated wireless telecommunications network having a circuit-switched portion and a packet-switched portion, said method comprising the steps of:

storing a prepaid subscriber class (PPSC) in a home location register (HLR) in the network;

sending the PPSC from the HLR to a Mobile Switching Center (MSC) serving the prepaid subscriber when the subscriber registers in the circuit-switched portion of the network;

sending the PPSC from the HLR to a packet-switched service node serving the prepaid subscriber when the subscriber registers in the packet-switched portion of the network;

upon beginning a circuit-switched call by the mobile subscriber, periodically sending partial call data records (CDRs) from the MSC to a prepaid center (PPC);

upon beginning a packet-switched data session by the mobile subscriber, periodically sending partial CDRs from the packet-switched service node to the PPC;

calculating in the PPC in near real time, a new account balance for the prepaid subscriber; and stopping the prepaid subscriber service when the account balance is reduced to zero.

7. The method of providing a prepaid subscriber service of claim 6 wherein the step of stopping the prepaid subscriber service when the account balance is reduced to zero includes the steps of:

sending a first message from the PPC to the HLR to erase the subscriber's subscription;

if the mobile subscriber is currently conducting a packet-switched data session, sending a second message from the HLR to the packet-switched service node notifying the service node that the subscriber's subscription has been erased;

if the mobile subscriber is currently placing a circuit-switched call, sending the second message from the HLR to the MSC notifying the MSC that the subscriber's subscription has been erased;

ending the data session by the packet-switched service node in response to the second message if the mobile subscriber is currently conducting a packet-switched data session; and disconnecting the circuit-switched call by the MSC in response to the second message if the mobile subscriber is currently placing a circuit-switched call.

8. The method of providing a prepaid subscriber service of claim 7 wherein the HLR retains the subscriber's subscription in the HLR, and falsely notifies the service node that the subscriber's subscription has been erased.

9. A method of providing a prepaid subscriber service to a mobile subscriber in an integrated wireless telecommunications network having a circuit-switched portion and a packet-switched portion, said method comprising the steps of:

creating for the mobile subscriber, a combined subscription for circuit-switched services and packet-switched services in a home location register (HLR) in the network;

creating for the mobile subscriber, a combined account for circuit-switched services and packet-switched services in a prepaid center (PPC);

sending a Subscriber Type field in a message from the HLR to a Mobile Switching Center (MSC) serving the prepaid subscriber when the subscriber registers in the circuit-switched portion of the network;

sending the Subscriber Type field in a message from the HLR to a packet-switched service node serving the prepaid subscriber when the subscriber registers in the packet-switched portion of the network;

upon beginning a packet-switched data session by the mobile subscriber, periodically sending partial call data records (CDRs) from the packet-switched service node to the PPC;

upon beginning a circuit-switched call by the mobile subscriber, periodically sending partial call data records (CDRs) from the MSC to the PPC;

calculating in the PPC in near real time, a new account balance for the prepaid subscriber's combined account; and stopping both the circuit-switched services and the packet-switched services when the account balance is reduced to zero.

10. A system for providing a prepaid subscriber service to a mobile subscriber in an integrated wireless telecommunications network having a circuit-switched portion and a packet-switched portion, the system comprising:

a home location register (HLR) which stores a prepaid subscriber class (PPSC) for the mobile subscriber;

a Mobile Switching Center (MSC) serving the prepaid subscriber in the circuit-switched portion of the network;

a packet-switched service node serving the prepaid subscriber in the packet-switched portion of the network;

means for sending the PPSC from the HLR to the MSC when the subscriber registers with the MSC, and for sending the PPSC from the HLR to the packet-switched service node when the subscriber registers with the packet-switched service node;

means for setting up a circuit-switched call for the subscriber;

means for setting up a packet-switched data session for the subscriber;

means within the MSC for periodically sending partial call data records (CDRs) during the circuit-switched call to a prepaid center (PPC) in response to the PPSC;

means within the service node for periodically sending partial call data records (CDRs) during the data session to the PPC in response to the PPSC;

means within the PPC for calculating in near real time, a new account balance for the prepaid subscriber;

means within the MSC for disconnecting the circuit-switched call when the account balance is reduced to zero; and means within the packet-switched service node for ending the data session when the account balance is reduced to zero.

11. A method of providing a prepaid subscriber service to a mobile subscriber in an integrated wireless telecommunications network having a circuit-switched portion and a packet-switched portion, said method comprising the steps of:

creating for the mobile subscriber in a home location register (HLR) in the network, a subscription for at least one of a circuit-switched service and a packet-switched service;

creating for the mobile subscriber in a prepaid center (PPC), an account for at least one of the circuit-switched service and the packet-switched service;

sending a prepaid subscriber class (PPSC) in a message from the HLR to a Mobile Switching Center (MSC) serving the prepaid subscriber when the subscriber registers in the circuit-switched portion of the network;

sending the prepaid subscriber class (PPSC) in a message from the HLR to a serving packet-switched service node serving the prepaid subscriber when the subscriber registers in the packet-switched portion of the network;

sending the PPSC in a message from the serving packet-switched service node to a gateway packet-switched service node at a Packet Data Protocol (PDP) context activation;

upon beginning a packet-switched data session by the mobile subscriber, periodically sending partial call data records (CDRs) from at least one of the serving packet-switched service node and the gateway packet-switched service node to the PPC;

upon beginning a circuit-switched call by the mobile subscriber, periodically sending partial call data records (CDRs) from the MSC to the PPC;

calculating in the PPC in near real time, a new account balance for the prepaid subscriber's account; and stopping at least one of the circuit-switched service and the packet-switched service when the account balance is reduced to zero.

* * * * *